United States Patent [19]

Burger et al.

[11] 4,391,556
[45] Jul. 5, 1983

[54] PROCESS FOR CONSOLIDATING GEOLOGICAL FORMATIONS

[75] Inventors: Jacques Burger, Bougival; Charles Bardon; Claude Gadelle, both of Rueil Malmaison, all of France

[73] Assignee: Institut Francais Du Petrole, Rueil-Malmaison, France

[21] Appl. No.: 219,605

[22] Filed: Dec. 24, 1980

[30] Foreign Application Priority Data

Dec. 28, 1979 [FR] France .................................. 79 32017

[51] Int. Cl.³ .................... E02D 3/12; E21B 33/138
[52] U.S. Cl. .................................. 405/264; 166/288; 166/294; 166/300
[58] Field of Search ............... 166/270, 288, 294, 295, 166/300; 405/264; 106/95

[56] References Cited

U.S. PATENT DOCUMENTS

| | | | |
|---|---|---|---|
| 3,180,412 | 4/1965 | Bernarski et al. | 166/260 |
| 3,269,461 | 8/1966 | Strange et al. | 166/288 |
| 3,360,041 | 12/1967 | Santourian | 166/260 |
| 3,388,743 | 6/1968 | Engle | 166/260 |
| 3,490,530 | 1/1970 | Dean et al. | 166/260 |
| 3,941,191 | 3/1976 | Pusch | 166/260 X |

FOREIGN PATENT DOCUMENTS 975229 11/1964 United Kingdom.

Primary Examiner—James A. Leppink
Assistant Examiner—George A. Suchfield
Attorney, Agent, or Firm—Millen & White

[57] ABSTRACT

This process comprises injecting into the formations a liquid organic mixture containing at least one polymerizable chemical compound and a catalyst. The organic mixture reacts with a limited amount of a injected oxidizing gas to give a solid product which consolidates the formations without substantially reducing their permeability. The catalyst is characterized by the combination of lead and of at least an element of the group constituted by nickel, copper and zinc.

16 Claims, 1 Drawing Figure

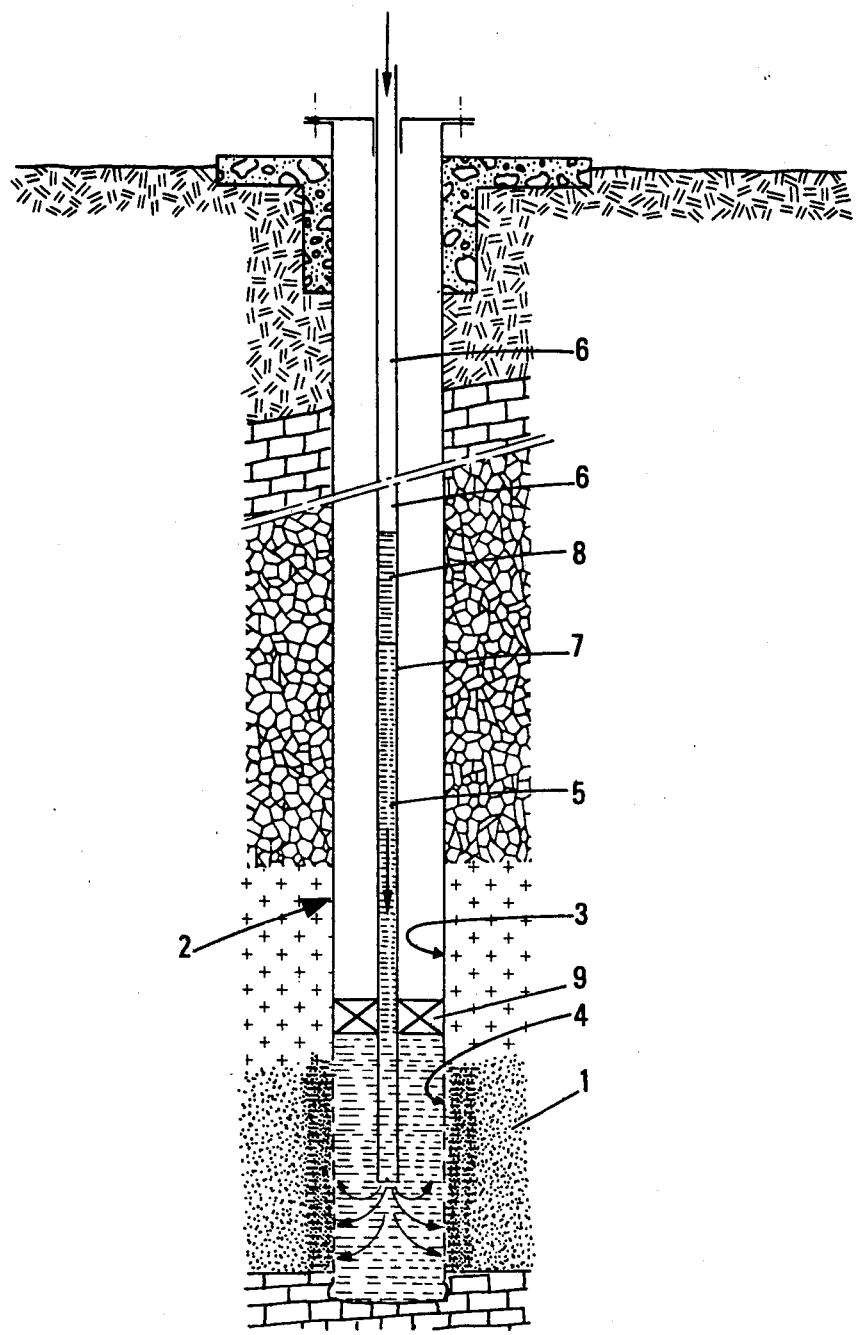

PROCESS FOR CONSOLIDATING GEOLOGICAL FORMATIONS

BACKGROUND OF THE INVENTION

The present invention relates to a process for consolidating geological formations, this process being in particular applicable to oil and gas reservoirs, to prevent sand from flowing into a well traversing unconsolidated, or insufficiently consolidated, sand formations.

More generally, this process can be used to locally consolidate permeable formations.

Various methods have been proposed to prevent sand from flowing into new boreholes, or to treat wells liable to be subjected to sand flowing during exploitation of oil or gas deposits.

A first type of method consists of maintaining the sand by mechanical means, using artificial screens with calibrated apertures or packs of gravels having a well-defined size distribution, depending on the size of the sand particles or grains of the geological formation traversed by the borehole. Such a method is very often applied to new wells, but is difficult to put into operation.

A second type of method consists of injecting into the geological formation a liquid resin which by polymerization creates a bound between the sand grains.

The efficiency of a chemical method of this second type is uncertain, since the reaction of polymerization of the injected resin depends essentially on the conditions prevailing in the borehole at the level of the formation, and on the characteristics of the latter. Thus such a method does not permit control of the extent of the chemical reaction.

There is thus the risk either of an insufficient consolidation of the formation if the degree of polymerization of the resin is not sufficient, or of an excessive reduction of the permeability of the geological formation, or even of complete plugging thereof, if a too large an amount of polymer is retained in some of the pores of the formation.

Another method, which is described in British Pat. No. 975,229, consists of successively introducing into the formation a material consisting essentially of an unsaturated fatty acid, then an oxygenated gas, with a view toward obtaining a resinification of said material.

However, a proper consolidation is obtained by this method only if the formation to be consolidated is at a temperature comprising between 150° and 300° C., or is heated to such a temperature which is much higher than the normal temperatures of oil or gas reservoirs.

It has been contemplated in this prior art patent to add a catalyst made of cobalt naphthenate or manganese naphthenate.

Even in this last case, the so-obtained consolidation is satisfactory only if the temperature of the formations is sufficiently high.

U.S. Pat. No. 3,388,743 also discloses a consolidation method wherein injection of a drying oil into formations surrounding a borehole is followed by the injection of an oxidizing gas.

The partially oxidized oil constitutes a good binding material for the sand particles.

By using an oxidizing catalyst, such as lead or cobalt naphthenate, it is possible to shorten the time required for oxidizing the oil.

However, the consolidation obtained by application of this method is generally insufficient for the object at which it is aimed.

French Pat. No. 1,409,599 teaches a process for consolidating the grounds wherein these grounds are treated by oily polymers containing siccative or drying catalysts which are hardened by air drying on the surface of the ground to be consolidated.

This treatement which produces hard, impermeable ground masses is however, not suitable for consolidating subterranean formations whose permeability must be preserved.

SUMMARY OF THE INVENTION

The object of the present invention is accordingly to provide a simple and reliable process for consolidating a geological formation without substantially reducing its permeability, this process being applicable to ground formations whose characteristics may vary within a rather wide range.

This method is particularly suitable for treating oil or gas wells were sand flowing is liable to occur.

This result is obtained, according to the invention by controlling the chemical alteration of a polymerizable material.

This process comprises injecting into the formation a liquid mixture of organic products of which is achieved in situ a moderate chemical alteration by contacting this liquid mixture with a determined quantity of an oxidizing gas, so as to transform said liquid mixture by an exothermic reaction into a substance which binds the unconsolidated elements of the formation, the injection of oxidizing gas permitting avoidance of any substantial reduction in the permeability of this formation relative to oil or natural gas.

The composition of the liquid mixture, as well as the oxygen content and the quantity of oxidizing gas are adjusted so as to enable the reaction to start at the normal temperature of the formation, and so as to control the extent of the oxidizing reaction of polymerization of the liquid mixture.

More particularly the invention provides a method for consolidating a geological formation comprising the following two successive steps:

a-Injecting into the formation a liquid organic mixture containing at least one polymerizable chemical compound and a catalyst, this mixture being capable of being subjected in situ, at the contact of an oxidizing gas, to chemical reactions, starting at the normal temperature of the geological formation and producing a solid product which consolidates the formation without substantially reducing its permeability, and b-Injecting a sufficient quantity of an oxidizing gas to achieve substantially complete solidification of said organic liquid, this quantity being however, so limited that the temperature reached in the formation during said reactions does not exceed 350° C. and is preferably comprised between 150° C. and 250° C.

The process according to the invention is characterized in that said liquid organic mixture contains a catalyst comprising in combination lead and at least one element of the group formed by nickel, copper and zinc.

The process according to the invention is efficient even if the temperature of the formation (which is in particular dependent on its depth) is low, since the reaction of oxidation of the organic material causes a sufficient heat release in the treated zone so as to reach the thermal level enabling the organic mixture to be efficiently polymerized, and providing a proper cohesion between the grains of the geolical formation.

Moreover, the oxygen content of the injected oxidizing gas and the amount of oxygen introduced into the formation are controlled so as to not exceed the maximum temperature which would lead to degradation of the polymerized material.

The organic mixture used in the process according to the invention may be advantageously constituted by a drying oil, optionally diluted by an organic solvent, a catalyst as above defined being added to this oil.

The utilized drying oil will advantageously be linseed oil, tung oil (wood oil), safflower oil, or more generally vegetable oils having a high content of polyethylenic compounds.

The employed solvents will be constituted, for example, by hydrocarbons such as benzene, toluene, xylene, or by a petroleum cut; the solvent content will advantageously comprise between 0 and 50% to limit the reactivity decrease resulting from dilution.

The components of the catalyst will be used in the form of salts, such as carboxylates, naphthenates, sulfonates, octoates etc., soluble in the basic components of the organic mixture. The content of each of the metals used in the catalyst in the solution will be smaller than 3 percent by weight, preferably comprised between 0.007 and 2 percent by weight. The exact composition of the catalyst (selected metals and respective contents thereof) will depend on the nature of the surrounding medium and on the conditions prevailing in the deposit (pressure, temperature, etc.).

The amount of the injected organic mixture will be preferably smaller than 500 liters per meter of thickness of the geological formations, however, larger quantities will not decreasee the efficiency of the method according to the invention.

In the application of the method to oil reservoirs, the injected oxidizing gas will be preferably oxygen or air, optionally diluted with nitrogen, carbon dioxide or another gas which is chemically inert under the operating conditions. In the application of the method to gas reservoirs, the use oxidizing gaseous mixture will preferably be oxygen or air diluted by nitrogen, another inert gas or dry natural gas; however, the content of natural gas must be such that the gaseous mixture remains outside the limits of its explosive range during the test conditions.

The volumetric oxygen content of the gaseous mixture will be advantageously comprised between 0.5 and 100%, and preferably between 1 and 21%. The oxygen content for a given composition of the organic mixture will preferably be reduced as the injection pressure increases. The presence of water in the gaseous mixture will be avoided by a suitable drying treatment, if necessary.

Proportioning of the oxidizing mixture will be effected at the ground surface, the components of the mixture being either supplied from compressed gas, or cryogenic gas bottles, or delivered by compressors.

The oxygen volume in the injected gas, measured under standard temperature and pressure conditions, will preferably be smaller than 200 liters per liter of injected organic mixture; excellent results are obtained by using between 10 and 80 liters oxygen per liter of organic mixture.

BRIEF DESCRIPTION OF THE DRAWINGS

FIG. 1 diagrammatically illustrates the arrangement for carrying out the process according to the invention.

DETAILED DESCRIPTION OF THE INVENTION

In the enclosed FIG. 1, which diagrammatically illustrates an embodiment of the process according to the invention, reference 1 designates a sandy geological formation traversed by a well 2, which comprises a casing 3 provided with apertures 4 at the level of the formation 1 from which a fluid, such as oil or natural gas, must be extracted.

In this embodiment the process according to the invention is carried out by successively injecting into the treated formation 1, predetermined quantities of an organic material 5 such as a drying oil to which a catalyst (as above-defined) has been added, optionally in admixture with another organic liquid, such as a solvent or a petroleum cut, and an oxidizing gas 6 such as air or oxygen diluted as above indicated.

The organic liquid mixture and the gas may be injected one after the other through the same production tubing 7, which opens at its lower end substantially at the lower level of the apertures 4.

Packer means 9 provides for sealing of the annular space between the casing 3 and the production tubing 7, above the formation 1.

In the tubing 7 the oxidizing gas is separated from the organic mixture through a plug 8 of a material which is little or not oxidable, this plug being, for example, constituted by a small volume of solvent or of a petroleum cut in an oil well, or of natural gas in a gas well.

It is thus possible to prevent reactions of the organic mixture from occurring in the production tubing itself.

Obviously the above-described embodiment is by no way limitative and other embodiments may be contemplated.

Generally speaking, the liquid injected at 5 is an organic mixture which at the contact of an oxidizing gas is capable of participating in a chemical alteration starting at the temperature of the formation 1 which leads to a consolidation of the formation in the vicinity of the well.

The liquid 5 is more easily alterable by the oxidizing mixture than the hydrocarbons contained in the formation, and than the basic organic compounds which do not contain any catalyst, thus resulting in the consolidation of the formation.

In the case of oil deposits, it will be advantageous before injecting the liquid 5 to inject fluids such a xylene, or a petroleum cut and an alcohol, such as isopropanol, in order to drive away oil and water present in the vicinity of the well, since excessive quantities of such oil and water may be detrimental to the efficiency of the consolidation of the medium.

The quantity of injected oxidizing gas will be determined so as to obtain complete solidification of the organic liquid 5, while preventing the temperature reached in the formation from exceeding 350° C., as a result of the evolved heat. Burning of the organic liquid 5 is avoided thereby, thus preventing any degradation of the polymerization product and providing for the protection of the well equipment, particularly of the casing 3.

The efficiency of the process according to the invention is illustrated by the following tests, the characteristics of the operating mode during these tests being by no way limitative.

TEST NO. 1

An intimate mixture of quarry sand (grain size comprised between 150 and 300 microns), and of linseed oil is packed at ambient temperature in a vertical tube having a thin wall, 20 cm in diameter and 15 cm in height. Heating collars are positioned around the tube over the height occupied by the mixture, so as to control lateral heat losses. In the case of a temperature increase, the electric power delivered to the collars adjusted so that the temperature measured within the mixture does not differ by more than 10° C. from the temperature measured at the same level against the wall of the tube.

The solid mass obtained by packing a mixture of 7.2 Kg sand and 0.63 Kg linseed oil has a porosity of 38% and a degree of saturation with linseed oil equal to about 40% of the pore volume. Its initial temperature is 20° C.

An air flow rate of 1.55 liter/minute is injected under atmospheric pressure through the upper end of the tube during 7 hours.

No decrease in the oxygen content of the gaseous effluent and no temperature increase of the impregnated porous medium could be ascertained.

At the end of the test, it appeared that solid mass remained unconsolidated.

It is thus apparent that under the selected operating conditions no reaction occurs in the solid mass impregnated with linseed oil without catalyst.

TEST NO. 2.

An intimate mixture of a mineral support and of a liquid organic mixture is packed at ambient temperature in a vertical thin walled tube 12.5 cm in diameter which constitutes the inner housing of a high pressure cylindrical cell. The inner tube is provided with heating collars and with a thermal insulating coating to compensate for temperature losses during the thermal increase of the solid mass.

The utilized organic mixture is linseed oil with the addition of 1.68% weight of lead in the form of naphthenate, and the mineral support is quarry sand with the addition of 5% kaolinite. The test is effected under a relative pressure of 10 bars with an air flow rate of 3 liters/minute (measured under standard temperature and pressure conditions).

During the test which lasted 6 hours the temperature rised from 20° C. to a maximum value of 48° C., and the low extent of the reaction did not permit consolidation of the solid mass.

TEST NO. 3

A test was performed under operating conditions identical to those of the test No. 2, but using as the organic mixture linseed oil with the addition of 0.3% weight of nickel octoate.

Neither a temperature rise nor a consolidation of the medium could be ascertained.

TEST NO. 4

Negative results were also obtained when operating under conditions similar to those of TEST NO. 2 but with an air flow rate of 1.5 liter/minute (measured under standard conditions) and using as an organic mixture linseed oil with the addition of 0.06 weight % of copper naphthenate.

TEST NO. 5

A test similar to the TEST NO. 2 was effected using this time linseed oil with the addition of 1.68 weight % lead in the form of naphthenate and 0.3 weight % Nickel in the form of octoate.

The test was performed under a relative pressure of 10 bars with an air flow rate of 3 liters/minute (standard temperature and pressure conditions).

The reaction caused a temperature rise up to 195° C.

After the test it was ascertained that the medium had kept its permeability and was properly consolidated: its resistance to compression was 90 bars.

Thus the utilized catalyst gives excellent results in the consolidation of the solid medium.

TEST NO. 6

A test similar to the TEST NO. 2 was effected using this time as an organic mixture linseed oil with the addition of 1.68 weight % lead and 0.12 weight % copper, both in the form of naphthenate.

The test was performed under a relative pressure of 10 bars with an air flow rate of 3 liters/minute (measured under standard conditions) during 7 hours 40 minutes. The reaction caused a temperature rise from 20° to 260° C.

At the end of the test it was ascertained that the medium has kept its permeability and was perfectly consolidated. Its resistance to compression was 92 bars.

TEST NO. 7

A test was performed under operating conditions similar to those of test No. 2, but using this time as an organic mixture linseed oil with the addition of 1.68 weight % of lead and 0.2 weight % of zinc. In the course of the test which lasted 7 hours, it a temperature rise from 20° to 240° C. was observed in the solid mass.

After the test it appeared that the medium has kept its permeability and was perfectly consolidated. Its resistance to compression was 74 bars.

What is claimed is:

1. A process for consolidating a geological formation, comprising the following two successive steps:
   a-injecting into the formation a liquid organic mixture containing at least one polymerizable chemical compound, said mixture being capable, in situ, at the contact of an oxidizing gas, of reactions starting at the normal temperature of the formation and leading to the production of a solid product which consolidates said formation without substantially reducing its permeability, and,
   b-injecting an oxidizing gas in a sufficient quantity to produce substantially complete solidification of said organic liquid, said quantity being so limited that the temperature reached in the formation during said reactions does not exceed 350° C., wherein said liquid organic mixture contains a catalyst comprising in combination: (a) lead and (b) at least one of nickel, copper or zinc.

2. A process according to claim 1, wherein said elements in the catalyst are used in the form of salts soluble in the basic components of said liquid organic mixture.

3. A process according to claim 1, wherein said at least one polymerizable chemical compound comprises a drying oil.

4. A process according to claim 1, wherein said at least one polymerizable chemical compound comprises linseed oil.

5. A process according to claim 1, wherein said at least one polymerizable chemical compound comprises wood oil.

6. In a process for consolidating a geological formation, comprising injecting into the formation a liquid organic mixture containing at least one polymerizable chemical compound and a catalyst, and injecting, in situ, an oxidizing gas, to cause reactions starting at the normal temperature of the formation and leading to the production of a solid product which consolidates this formation without substantially reducing its permeability, the improvement comprising employing as said catalyst, in combination: (a) lead and (b) at least one of nickel, copper or zinc.

7. A process according to claim 6, wherein said elements in the catalyst are used in the form of salts soluble in the basic components of said liquid organic mixture.

8. A process according to claim 6, wherein said at least one polymerizable chemical compound comprises a drying oil.

9. A process according to claim 6, wherein said at least one polymerizable chemical compound comprises linseed oil.

10. A process according to claim 6, wherein said at least one polymerizable chemical compound comprises wood oil.

11. A process according to claim 6, wherein oxidizing gas is injected in an amount to cause reaction of the liquid mixture to start at the normal temperature of the formation, and to control the temperature reached in the formation so as to not exceed 350° C.

12. A process according to claim 6 or 11, wherein said amounts of oxidizing gas is limited so that the reaction temperature does not exceed about 150°-250° C.

13. A process according to claim 1 or 6, wherein said at least one polymerizable chemical compound comprises a drying oil, and said catalyst.

14. A process according to claim 13, wherein said drying oil is diluted in an amount up to 50% by a solvent comprising a hydrocarbon which comprises at least one of benzene, toluene, xylene, and a petroleum cut.

15. A process according to claim 1 or 6, wherein said catalyst comprises no more than 3 percent by weight of the organic mixture.

16. A process according to claim 15, wherein said catalyst comprises 0.007-2 percent by weight of the organic mixture.

* * * * *